United States Patent
Fradkov et al.

(10) Patent No.: US 7,415,715 B2
(45) Date of Patent: Aug. 19, 2008

(54) TRANSACTION EXECUTION SYSTEM INTERFACE AND ENTERPRISE SYSTEM ARCHITECTURE THEREOF

(75) Inventors: Sergey Fradkov, New York, NY (US); Igor Khomykov, Brooklyn, NY (US); Leonid Iakovlev, Vantaa (FI); Anatoliy Trifel, Brooklyn, NY (US); Andrew Meshkov, Brooklyn, NY (US)

(73) Assignee: Simplexity, LLC C/O Versa Capital Management, Inc., Philadelphia, PA (US)

( * ) Notice: Subject to any disclaimer, the term of this patent is extended or adjusted under 35 U.S.C. 154(b) by 1010 days.

(21) Appl. No.: 10/455,692

(22) Filed: Jun. 6, 2003

(65) Prior Publication Data

US 2004/0024610 A1 Feb. 5, 2004

Related U.S. Application Data

(63) Continuation of application No. 09/229,473, filed on Jan. 13, 1999, now abandoned.

(60) Provisional application No. 60/072,569, filed on Jan. 26, 1998.

(51) Int. Cl.
*G06F 9/46* (2006.01)
*G06F 15/16* (2006.01)
*G06Q 10/00* (2006.01)

(52) U.S. Cl. .................. 719/328; 719/310; 709/200; 709/217; 709/218; 709/250; 705/1; 705/9

(58) Field of Classification Search ......... 719/300–332; 718/1, 100–108; 709/200–253; 705/1, 9
See application file for complete search history.

(56) References Cited

U.S. PATENT DOCUMENTS 5,701,451 A * 12/1997 Rogers et al. ............... 707/1

(Continued)

FOREIGN PATENT DOCUMENTS

EP 0527639 2/1993

(Continued)

OTHER PUBLICATIONS

International Search Report for PCT Application No. PCT/US99/01512.

(Continued)

*Primary Examiner*—Lewis A. Bullock, Jr.
*Assistant Examiner*—Jennifer N To
(74) *Attorney, Agent, or Firm*—Patton Boggs LLP

(57) ABSTRACT

A system for interfacing at least one user interactive device with a trade execution system to execute trading transactions requested by users over a network includes an application in communication with the network for interfacing between the at least one user interactive device and the trade execution system and coordinating interaction of the at least one user interactive device with the trade execution system. The application contains first and second APIs. The first API is structured to deliver a trading transaction request received from the at least one user interactive device to the trade execution system. The second API is structured to deliver real-time information relating to the trading transaction request received from the trade execution system to the at least one user interactive device. The first API includes at least one stub that is called by the application at a predefined step during processing of the trading transaction request. The at least one stub includes code to interface the application with the trade execution system.

28 Claims, 8 Drawing Sheets

U.S. PATENT DOCUMENTS

| | | | | |
|---|---|---|---|---|
| 5,721,908 | A * | 2/1998 | Lagarde et al. | 707/10 |
| 5,754,772 | A * | 5/1998 | Leaf | 709/203 |
| 5,778,178 | A * | 7/1998 | Arunachalam | 709/203 |
| 5,812,668 | A * | 9/1998 | Weber | 705/79 |
| 5,857,100 | A * | 1/1999 | Phillips et al. | 718/101 |
| 5,870,719 | A * | 2/1999 | Maritzen et al. | 705/26 |
| 5,933,816 | A * | 8/1999 | Zeanah et al. | 705/35 |
| 5,978,840 | A * | 11/1999 | Nguyen et al. | 709/217 |
| 6,003,019 | A * | 12/1999 | Eaton et al. | 705/42 |
| 6,038,587 | A * | 3/2000 | Phillips et al. | 709/101 |
| 6,094,688 | A * | 7/2000 | Mellen-Garnett et al. | 709/328 |
| 6,125,384 | A * | 9/2000 | Brandt et al. | 709/203 |
| 6,144,990 | A * | 11/2000 | Brandt et al. | 709/203 |
| 6,151,637 | A * | 11/2000 | Phillips et al. | 709/201 |
| 6,285,989 | B1 * | 9/2001 | Shoham | 705/37 |
| 6,289,393 | B1 * | 9/2001 | Phillips et al. | 709/315 |
| 6,317,773 | B1 * | 11/2001 | Cobb et al. | 718/101 |
| 6,397,253 | B1 * | 5/2002 | Quinlan et al. | 709/227 |
| 6,480,861 | B1 * | 11/2002 | Kanevsky et al. | 707/103 Y |

FOREIGN PATENT DOCUMENTS

| | | |
|---|---|---|
| EP | 0527639 A2 | 2/1993 |
| WO | 91/09370 | 6/1991 |
| WO | 96/32701 | 10/1996 |
| WO | WO 96/32701 | 10/1996 |
| WO | 97/17678 | 5/1997 |
| WO | 97/18515 | 5/1997 |
| WO | WO 97/17678 | 5/1997 |
| WO | WO 97/18515 | 5/1997 |
| WO | WO 91/09370 | 6/1997 |
| WO | 97/49052 | 12/1997 |
| WO | WO 97/49052 | 12/1997 |

OTHER PUBLICATIONS

Office Action issued in U.S. Appl. No. 09/229,473, dated Apr. 28, 2003.

International Search Report for PCT Application No. PCT/US99/01512, no date.

International Search Report for Counterpart PCT Application.

* cited by examiner

Condition: [_____]

*FIG. 8A*

Comments:

Order Type: [Buy ▼]

*FIG. 8C*

Order Type:
  ○ Buy   ○ Sell   ○ Sell Short

*FIG. 8D*

Order Type:
  ○ Buy
  ○ Sell
  ○ Sell Short

*FIG. 8E*

| Name | Type | Value | Sec Value | Cash Value | Loan Rate | Buying Power | Money Market |
|---|---|---|---|---|---|---|---|
| 221625IG | trading | 364656.812 | $364656.812 | $0.000 | 0.00% | $0.000 | $0.000 |
| 2123422HG | watchlist | 40225.000 | $40225.000 | $0.000 | 0.00% | $0.000 | $0.000 |

*FIG. 8F*

[ Add New Portfolio ]

*FIG. 8G*

TRANSACTION EXECUTION SYSTEM INTERFACE AND ENTERPRISE SYSTEM ARCHITECTURE THEREOF

This application is a Continuation of application Ser. No. 09/229,473 filed on Jan. 13, 1999 now abandoned, which is a continuation-in-part application of U.S. Provisional Application Ser. No. 60/072,569, filed on Jan. 26, 1998, both of which applications are fully incorporated by reference herein.

BACKGROUND OF THE INVENTION

1. Field of the Invention

The present invention relates to on-line transaction systems, and particularly to a transaction interface system for interfacing user interactive devices with a transaction execution system in a distributed network environment, and more particularly to a transaction interface system having an unified architecture which is compatible with existing transaction execution systems. The present invention also relates to the development of an enterprise system based on the unified architecture.

2. Description of Related Art

The dramatic growth of the information highway and network-centric computing significantly altered the way people conduct business transactions. For example, on-line transactions are becoming ubiquitous. A user may use a personal computer to access a company's transaction execution system to request and carry out a desired transaction. With the explosion of the World Wide Web and Internet technologies, on-line transactions are made more widely accessible to users. The conveniences of on-line business transactions have driven companies from across a broad spectrum of businesses to provide customers with the option of conducting on-line transactions.

The demand and ubiquity of on-line transactions fueled the development of various sophisticated transaction execution systems and related transaction application systems. With the availability of increasingly more powerful processors, many applications are designed to run on smaller scale network computer systems generally referred to as client-server systems. However, in the past, the transaction execution applications and transaction applications had been designed as dedicated systems which did not offer the flexibility of allowing easy addition of new features, and compatibility and interoperability with other applications.

For example, when a company having an existing transaction execution system wished to provide for user access for transaction via the Internet, an entirely new protocol had to be provided to interface the Internet with the existing transaction execution application. This required developing a new application or making significant modifications to the existing transaction execution application, and integration of the Internet interface into such modified transaction execution application. When it comes time to add another feature to the modified transaction execution system, additional modifications and integration into the transaction execution application would be required. Moreover, the Internet based interface of one transaction execution system is not compatible with another transaction execution system.

There are several drawback associated with having to develop new applications or make modifications to existing applications. The direct costs for making the modifications or developing a new application can be relatively high, especially in the case when a company undertakes to make modifications to an antiquated legacy system. Further, significant time and resource must be spent on debugging the entire new or modified transaction execution application to confirm its integrity. There is always the risk of discovering additional bugs in the new or modified application after it has been put into active service. Such new bugs may cause significant downtime of the transaction system to allow for debugging and bug fixing. More critically, the bugs may create irreversible errors in the execution of the transactions, which may proceed undetected until significant damages have been caused. For example in the financial industry, and more particularly in the securities trading business, an error in executing an on-line trade could have ramifications that cannot be reversed when the error is eventually detected several hours or days later.

The reason for the lack of compatibility of current transaction applications is partly due to the lack of an infrastructure in the past to allow development and deployment of large-scale, interactive applications on distributed networks, such as Intranets, Extranets, and the Internet. Specifically, in current implementations of Internet systems, Web servers route discrete requests from multiple browsers to the requested applications and databases. These discrete requests are received by the system as a series of unconnected "hits". This is due to a problem that generally exists in the Internet environment known as a lack of "application state". Without an application state, a system cannot track a user's prior actions, and it loses track of which requests came from which user. Moreover, the numerous variables required by the application in each instance of the program cannot be efficiently maintained in the Internet environment. (For example, while a request for a stock quote requires a single query to a database of current share prices, the manipulation of sales information for a customized report may involve a large number of variables and multiple queries to the database.) These problems are exacerbated when one visualizes a Web site or Internet system with hundred or thousands of simultaneous users, whereby multiple instances of an application may run concurrently. Until now, the lack of an application state in the Internet environment has prevented the deployment of sophisticated applications, which require tracking a user's actions throughout the entire program in the Internet environment. This has also lead to development of a variety of convoluted methods for making applications written in existing languages or for legacy environments work in the Internet environment.

Further, in the past, some developments cannot be carried out using technology the developers already owned, programming languages they already knew, and programming techniques they already understood. As a result, the development and maintenance costs in prior systems are relatively high. For example, there is a large market of corporate developers that do not feel comfortable developing new Web-based applications because they do not have the right systems in place to help them to do so. However, companies are hard pressed to develop such systems because of the competitive pressures and general advantages of the technology. Companies that start developing the Web systems in the absence of programming talent in-house are faced with the choice of significant time delay because of retraining of their people, or a significant expense of hiring new personnel or outsourcing.

SUMMARY OF THE INVENTION

The present invention provides an add-on transaction system that interfaces a network of users with an existing on-line transaction execution system, without requiring significant modifications to the functionality and/or protocol of such transaction execution system. This is accomplished by providing a set of novel application programmer interfaces ("API") which allows integration of specific transaction applications within the transaction system with virtually any existing transaction execution system on practically any platform. More specifically, two separate APIs are provided, a "transaction execution" API ("TE API") and a "transaction alert" API ("TA API"). The TE API provides the functionality of delivering trade information and user requests to the execution system, and the TA API allows the execution system to deliver real-time information to the user. The cooperation of the two APIs with the transaction system's core functionality provides an extremely flexible and secure way to implement two-way communication without actually modifying the transaction application itself.

In another aspect of the present invention, the transaction system is implemented to receive user transaction requests via networks which use IP network protocol ("IP network") (e.g., the Internet, which uses "transmission control protocol/Internet protocol" ("TCP/IP")). In a further aspect of the present invention, the transaction system is implemented to receive transaction requests via a wireless gateway, and more specifically via a digital packet-switched wireless gateway, which may be connected via an IP network to the transaction system. In a specific embodiment of the present invention, a novel financial trading system is disclosed.

According to yet another aspect of the present invention, an enterprise system having a novel unified architecture is disclosed which may be adopted for the IP network protocol based transaction system of the present invention. The enterprise system consists of one or more enterprise system managers, each managing a number of application servers. The system manager is connected to a Web server, and supports the Common Gateway Interface ("CGI") as well as server APIs of all major general purpose Web servers and all major browser technologies. The application servers are capable of running applications on remote computers and present a highly reliable and scalable system for deployment. The system manager tracks and provides an "application state" in each instance of the application programs running on the distributed application servers, even though the necessary data is received as a series of unconnected "hits" in the IP network environment. The system manager unites the information and applications residing on the different application servers within the otherwise unstructured IP network environment, so the applications work together seamlessly and efficiently, even if the types of application servers and related databases in the system are not compatible. The system manager also routes the data from the Internet to one or more application servers that are operating in parallel in accordance with the demand and availability of the application servers. The unified architecture provides a novel development environment. This development environment enables programmers to write large-scale applications in any of the ways familiar to them without them having to learn unfamiliar and complex languages.

In another aspect of the enterprise system of the present invention, a set of APIs is used to provide developers of enterprise applications with a simple and flexible means of developing Web applications running on multiple platforms. For each platform that the enterprise system runs on, a version of such API is created. All these APIs maintain the same set of base functionality, which is expressed in terms of the target platform. This functionality allows the developers to extract data entered by the user in to the Web page, store this information in the program variables and as a persistent context, and present newly generated data and pages to the user. Unlike existing methods of development of Web applications that require knowledge of particulars of CGI and HTTP implementations for a specific Web server, the APIs in the enterprise system hides these complexities from the developer and allows development of the Web applications in a cross-platform fashion.

In the IP network version of the transaction system of the present invention, the transaction system consists of one or more transaction applications which provide specific transaction ability, one or more transaction application servers which accommodate a large number of simultaneous user requests, and a transaction system manager which coordinates the activities of the transaction application servers. The APIs in the transaction system are structured based on the principle of the APIs in the enterprise system.

In a further aspect of the enterprise system, a special screen definition language ("UNML") has been developed to describe basic GUI elements such as text fields, images, input fields, command buttons, menus and tables. This is an embedded language that implements the "context free screen concept", where every screen and every element of the screen is independent from other elements. Using the UNML, information can be transmitted to the users in a device independent fashion, so that transmitted information can be displayed on various wireless devices based on their unique browser.

According to yet another aspect of the invention, a new, high level programming language, the Report Query Language ("RQL"), is disclosed, which may be used to develop transaction applications and other applications including IP network applications. RQL provides a programming environment similar to C, C++ and PERL, but makes it more convenient for programmers to manipulate and format relational and non-relational data. RQL also includes extensions which allow developers to rapidly create state-of-the-art Internet applications for Intranets and Web sites. A run time engine, and various software development kits are also available for RQL. RQL therefore simplifies the development of complex system, databases and network administration applications, as well as database applications and enterprise wide reporting applications for "traditional" client/server and Internet/Intranet environments.

BRIEF DESCRIPTION OF THE DRAWINGS

FIGS. 8a-8g represents the various placeholders in HTML templates that are supported by UNML conversion in accordance with one embodiment of the present invention.

DESCRIPTION OF THE ILLUSTRATED EMBODIMENTS

The following description is of the best presently contemplated mode of carrying out the invention. This description is made for the purpose of illustrating the general principles of the invention and should not be taken in a limiting sense. The scope of the invention is best determined by reference to the appended claims.

The inventive transaction system of the present invention will be described below in reference to the embodiment of a wireless financial instrument trading system. However, it is understood that the present invention may be adopted for other types of transaction systems without departing from the scope and spirit of the present invention. Similarly, the unified architecture aspect of the present invention will be described in reference to an IP network-based, and particularly an Internet-based, transaction application. It is equally understood that the unified architecture may be adopted for the development of other types of applications for Internet based, IP network-based, or other distributed network systems without departing from the scope and spirit of the present invention.

Transaction System Configuration

Figure 1:
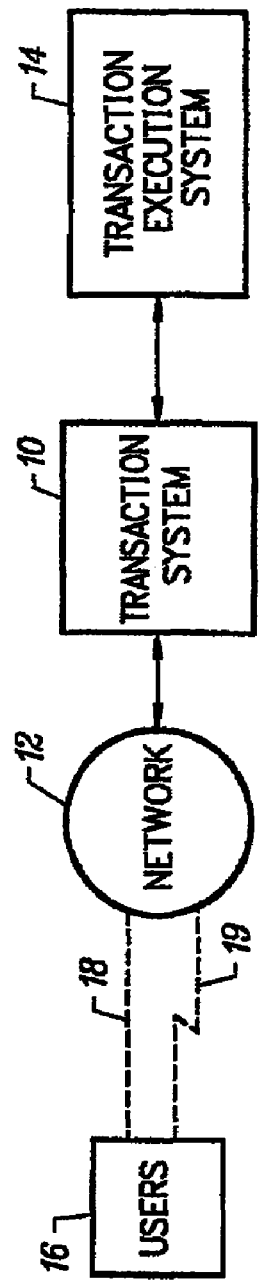
FIG. 1 is a schematic system block diagram illustrating the integration of the transaction system of the present invention with the transaction execution system in a network environment.

FIG. 1 is a schematic block diagram that illustrates interfacing an add-on transaction system 10 of the present invention between a network 12 and an existing on-line transaction execution system 14. As will be discussed in greater details below using the example of a financial trade system, the transaction system 10 includes a set of APIs that allows flexible integration of the transaction system 10 with virtually any existing transaction execution system 14 on practically any platform, without the need to significantly modify the functionality, system configuration, protocol, system architecture, or characteristics of the existing transaction execution system 14. Specifically, there is no need to modify the existing trade execution system 22 at a system level, beyond making minor application specific setup and configuration changes, if required, that are typical of system integration. Typically, recompilation of the existing transaction execution system would not be required, unless the changes to the setup and configuration necessitate otherwise.

The transaction system 10 may have the following exemplary user/system interfacing functions: coordinating the interactions of the transaction execution system 14 and the transaction requests from users received through the network; delivering information from the transaction execution system to the users; authenticating the users; and identifying the user requests; and routing user requests to the appropriate transaction execution system 14. The transaction system 10 may also include modules which perform transaction specific add-on functions or shell functions that are not found in the transaction execution system 14 and are relevant to and compatible with the specific nature of the transaction execution system 14. In the example of a trade execution system described in connection with FIGS. 2 and 4 below. These specific applications may include the following function categories: user portfolio management, trade order placement, view orders, and trade alert notification functions. The transaction execution system 14 actually executes the requested trade, but leaves the user interfacing functions to the transaction system 10. (In other words, the transaction system 10 handles the user interfacing functions independent of the functions of the transaction execution system 14.) An example of a transaction execution system is the "TRIARCH" trading system developed by Reuter, Ltd. The network 12 may be a local area network ("LAN"), wide area network ("WAN"), the Internet, Intranet, Extranet, and the like, which may be based on any protocol, including without limitation the IP network protocol. The network may be accessed by a user (at 16) by using an interactive device that has an appropriate graphical user interface (such as a personal computer, personal digital assistant ("PDA"), two-way pager, cellular phone, and the like) via land lines 18 or a wireless gateway 19.

Trade System Configuration

Figure 2:
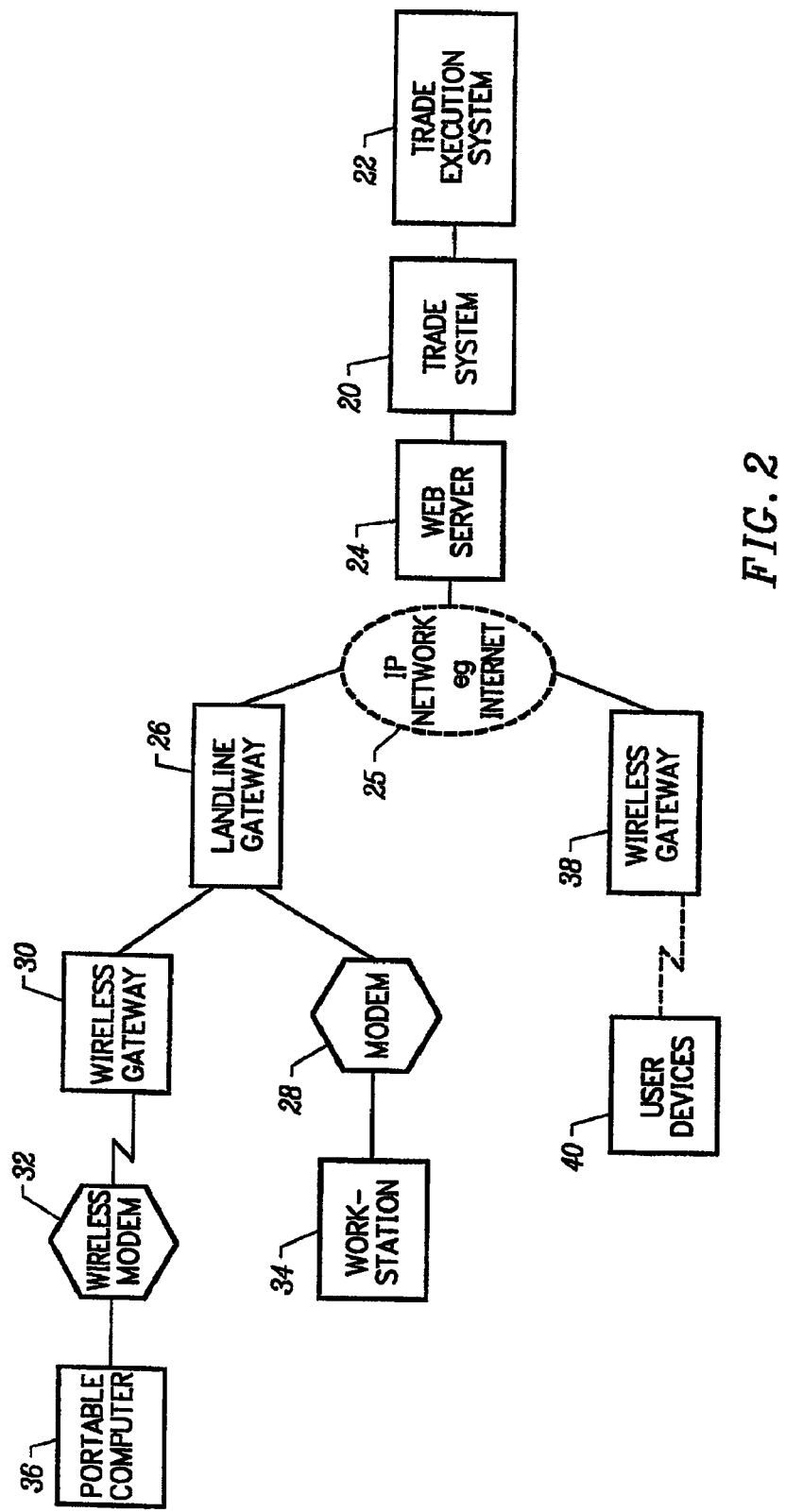
FIG. 2 is a schematic system block diagram illustrating the integration of an IP network-based transaction system with a transaction execution system, in accordance with one embodiment of the present invention.

Referring to FIG. 2, the present invention is illustrated in reference to an IP network based, and in particular an Internet based, financial instrument-trading environment. The transaction system in this embodiment is the trade system 20, which is connected to an existing trade execution system 22. In this particular embodiment, the trade system 20 is implemented to work with an IP network 25, such as the Internet that uses TCP/IP. The trade system 20 can be easily configured to work with other distributed networks, such as Intranet, Extranet and other LAN and WAN and the like, whether or not based on IP network protocols or other protocols, without departing from the scope and spirit of the present invention. At least one Web server 24 interfaces between the network 25 and the trade system 20. (Other types of servers may be used for other network systems depending on the network protocol, without departing from the scope and spirit of the present invention.) Traders can access the trade system 20 via the Internet by any conventional means, such as using any user interactive device that has an appropriate Web browser that is connected to a landline gateway 26 using a modem 28 or to a wireless gateway 30 using a wireless modem 32 (e.g., using a workstation 34 or a portable notebook computer 36). To enable a wider coverage for portable applications and added conveniences, a wireless gateway is provided for hand-held wireless interactive devices 40. The hand-held wireless devices may include Internet enabled cell phones (generally known as "smart phones", e.g., the ALCATEL's "One Touch Pro"), two-way pagers (e.g., the Inter@ctive Pager™ developed by Research In Motion Ltd.), PDAs (e.g., the NOKIA's "9000i Communicator", or 3COM's PalmPilot™), palmtop computers (e.g., HP's 320LX), etc. For cellular devices, a packet-switched network such as the Cellular Digital Packet Data ("CDPD") wireless network is currently the preferred implementation, as it provides an efficient, low cost system, for both setup and usage. For example, the AT&T PocketNet™ Service, or the like, would be a suitable wireless platform.

Figure 5:
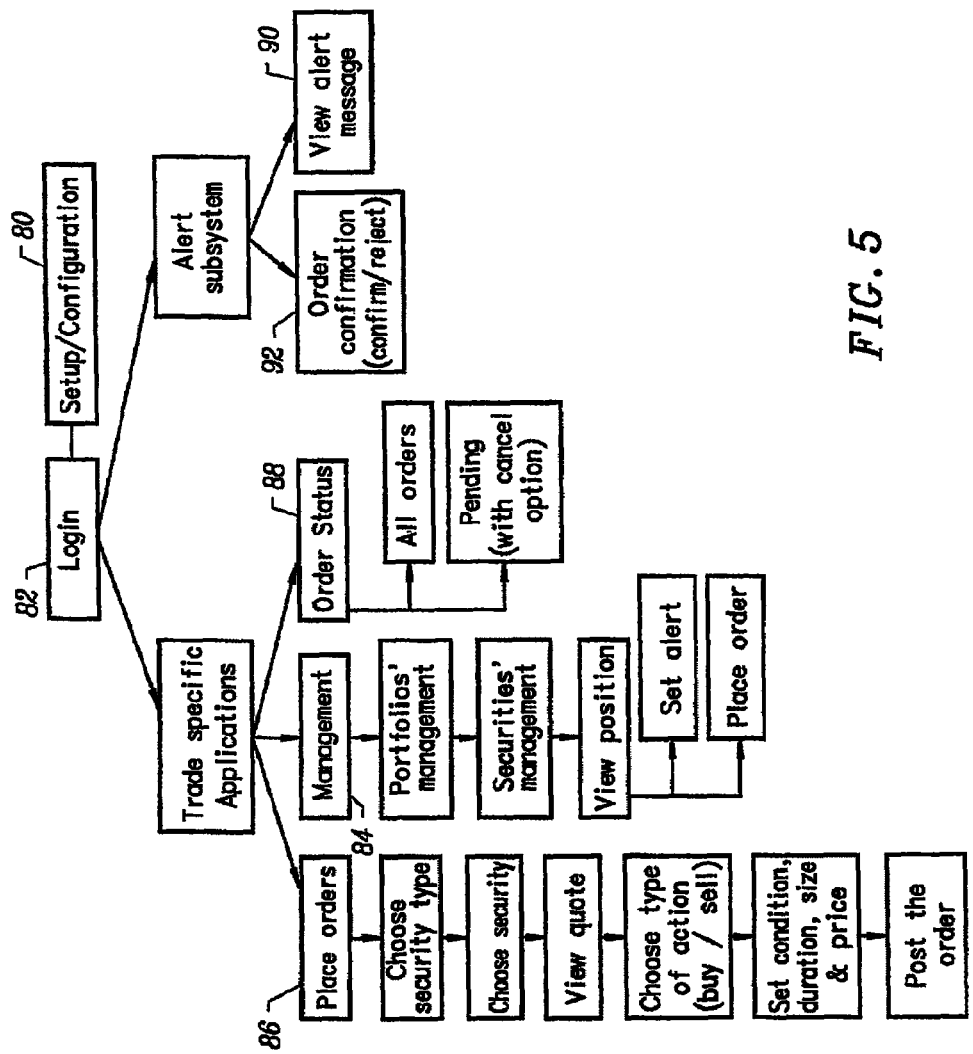
FIG. 5 is a chart of exemplary trade specific application functions.

The functionalities of the trade system 20 will be described, followed by a description of its architecture. The trade system 20 is designed to facilitate trading of all types of financial instruments (e.g., stocks, bonds, etc.). For example, the trading system creates a completely mobile trading environment where one can browse a stock quote portfolio, retrieve real-time stock prices and place market stop or limit orders on demand. The trade system 20 is a two-way system that handles user/system interfacing functions. This may include: coordinating the interactions of the trade execution system 22 and the transaction requests from users received through the network 25; delivering information from the trade execution system 22 to the users; authenticating the users; and identifying the user requests; and routing user requests to the appropriate trade execution system 22. The trade system 20 may also include modules which perform trade specific add-on functions or shell functions that are not found in the trade execution system 22, including the following function categories: user portfolio management, trade order placement, view orders, and trade alert notification functions. (FIG. 5 shows examples of the specific trade functions that are relevant to securities trading, which will be explained in greater detail below). The trade system 20 also include a module that can initiate communications to the traders to provide up to the minute price fluctuation alerts to the traders' interactive devices. This allows the traders to react immediately. By simply logging on to the trade system 20, a trader has the ability to check the trader's trade positions and execute any number of transactions. Immediately upon execution, each trade is confirmed by messaging directly to the trader's wireless interactive device 40 (e.g., a cellular phone). Confirmations can also be routed to email addresses and/or fax numbers designated by the trader. Such confirmation may be by way of a short message to trader's wireless device (e.g., cellular phone or pager) that the trade has been executed, with details of the trade being sent to a fax or email address designated by the trader. The trade system 20 allows flexibility for the trader to customize setup and configuration via the interactive device the desired options with respect to alerts, confirmation, access passwords, and other personal preferences for interfacing with the trade system 20. For those interactive devices 40 that are already IP network enabled, the traders' setups and configurations may be made via the trader's existing devices without requiring modifications to any physical configuration of the trader's existing interactive device 40. The trade system generates user screens in both "hand held device markup language" ("HDML") and "hyper text markup language" ("HTML") for wireless IP network devices as well as for networked computers. As will be discussed more fully, a special screen definition language ("UNML") is introduce in one aspect of the present invention which permits screen information to be transmitted to various wireless devices in a device independent fashion so that the information may be displayed based on the unique browser of each device.

Figure 4:
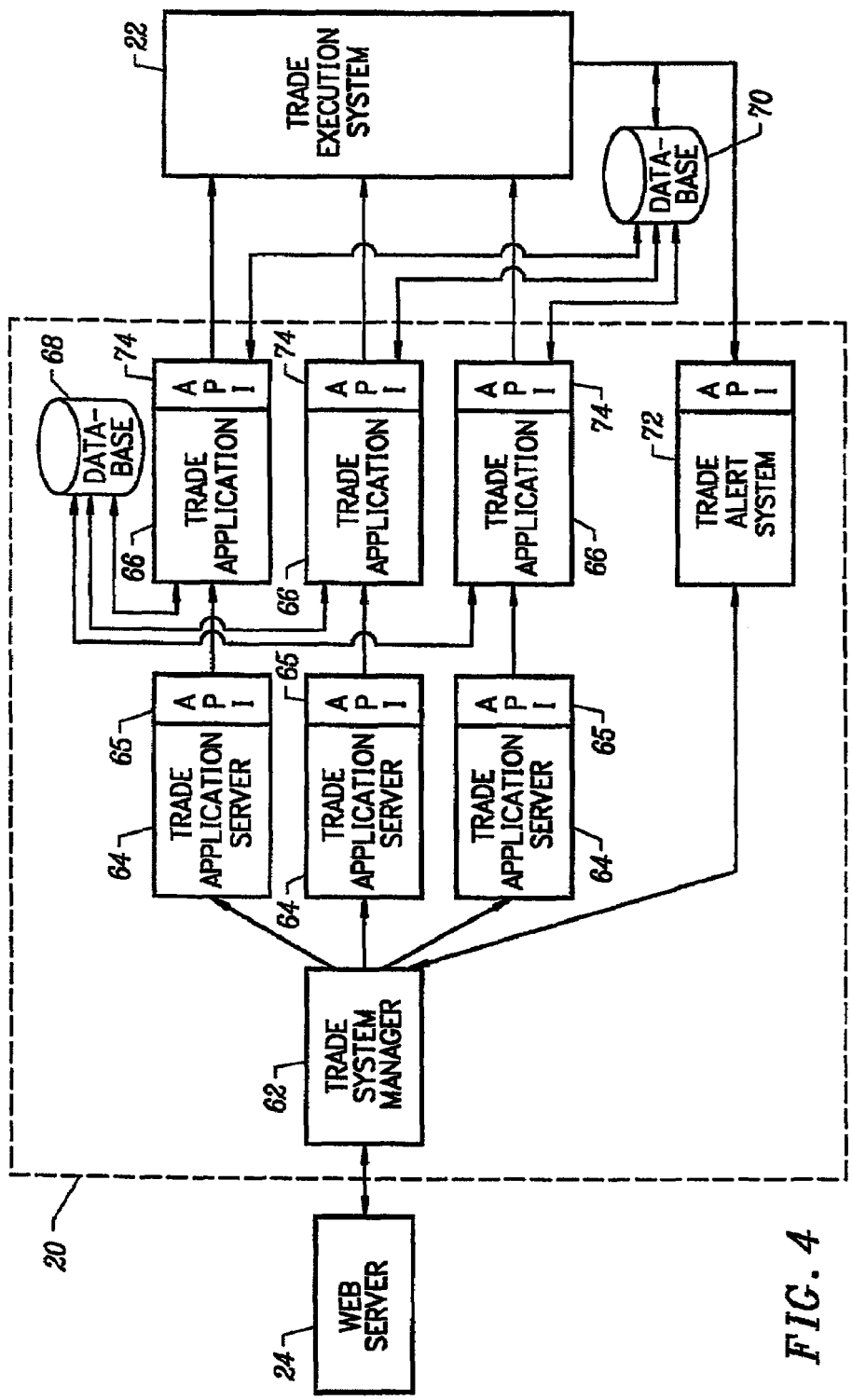
FIG. 4 is a functional block diagram of one embodiment of the IP network version of the transaction system of the present invention, as implement in accordance with the unified architecture.

Transparent to the traders, the trade system consists of multiple application servers and a system manager (see also FIG. 4). The trade system is structured and configured such that it controls interaction with and input from the traders' device and coordinates each trader's session activities. As the trade system 20 is accessible by a large number of users, it is structured and configured to bring order and logic to busy IP network trading environments by binding together all system components and connecting unconnected "hits" from each trader into a single session. It also provides load balancing and high availability by distributing transactions to multiple application servers (see discussions below in connection with FIG. 4). Simultaneous trading activities of an unlimited number of traders is accommodate by managing instances of trading applications required for each. The trade system 20 is configured to be scalable, by adding additional application servers. The system has a set of APIs which are linkable to virtually any existing real-time price feed, proprietary database and trade execution system 22, Web site and Intranet, without the need to significantly modify the functionality, system configuration, protocol, system architecture, or characteristics of the existing trade execution system 22. Specifically, there is no need to modify the existing trade execution system 22 at a system level, beyond making minor application specific setup and configuration changes, if required, that are typical of system integration. Typically, recompilation of the existing trade execution system would not be required, unless the changes to the setup and configuration necessitate otherwise.

The trade system 20 works with either its own system database, or a proprietary database that is associated with the particular trade execution system 22. Each trader's transaction information is stored in either the system database or the proprietary database as each instance of the trade session is started following user authentication and login.

Enterprise System

Figure 3:
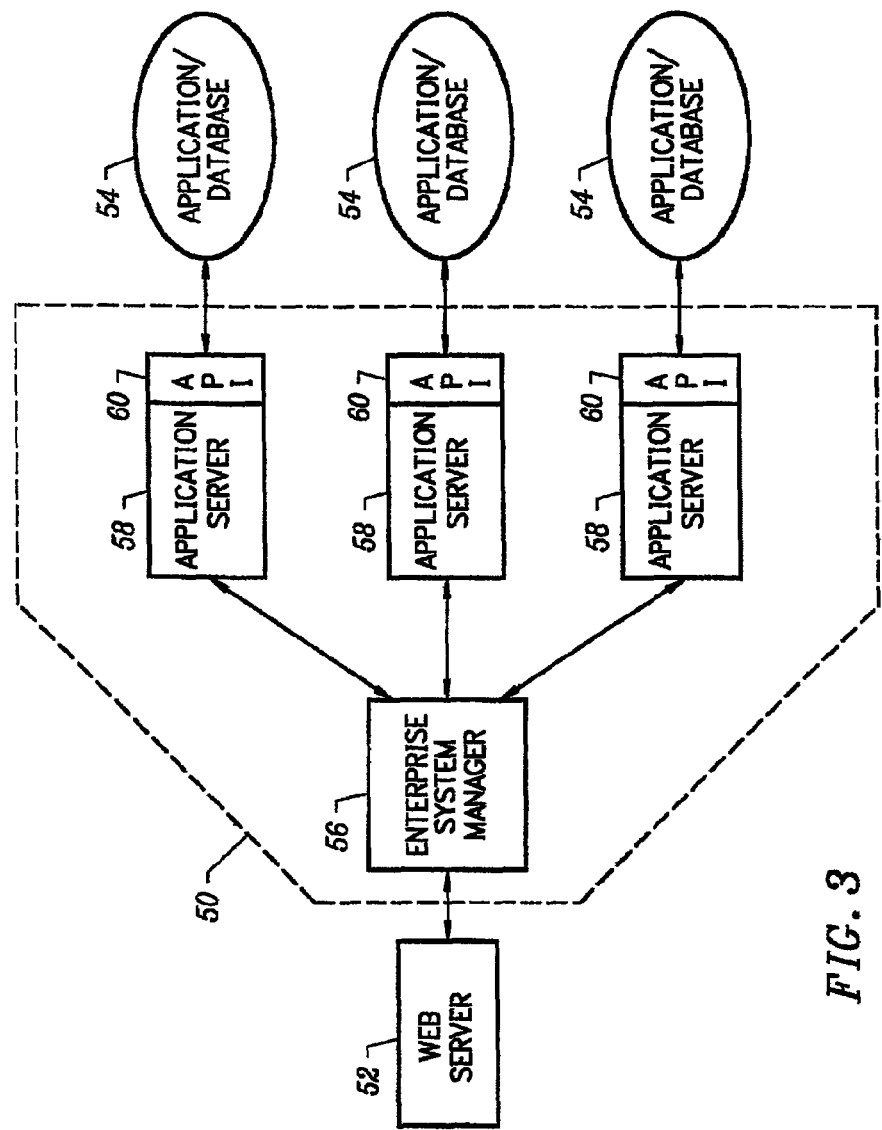
FIG. 3 is a functional block diagram of the unified architecture in an enterprise system in accordance with another aspect of the present invention.

Before describing the specific components of the trade system 20, it would be beneficial to discuss another aspect of the present invention, which involves the system architecture of an enterprise system that forms the basis of the trade system 20. FIG. 3 shows the novel enterprise system architecture. It is understood that the trade system 20 may also be configured based on other architectures to achieve the desired functions.

The enterprise system 50 has a novel unified system architecture that moves the IP networks to the next level by enabling deployment of large-scale applications in a cost effective manner. The enterprise system 50 infrastructure unites information and applications residing on different application servers, so systems work together seamlessly and efficiently, even if the types of servers and databases in the system are not compatible. The enterprise system 50 also has the following attributes: (a) the system provides familiar ways of programming using the tools already know to minimize the learning curve of personnel, regardless of their background; (b) the system has a flexible and powerful deployment environment to allow a developer to create a unified infrastructure for Web applications across operation system, programming tools and languages and database; and (c) the system includes ability to build both interactive and reporting applications, since both kinds are in equal wide use on the Web.

Referring specifically to FIG. 3, the enterprise system 50 is located between a Web server 52 and databases and applications 54. It accepts web requests from the Web server 52 and performs processing on those requests, passing them to the correct applications 54. The applications connect to databases, data feeds and other sources of data, collecting the results and returning them to the user.

Enterprise System Manager

Several important components make the heart of the enterprise system 50. First is the system manager 56. The system manager 56 adds a layer of management to an otherwise unstructured system, providing an application state for the IP network environment. The system manager 56 tracks and manages the actions of an unlimited number of users accessing the system at the same time, even though user requests are received as a series of unconnected "hits". The system manager 56 also provides load balancing and high availability by routing each request to the most appropriate application server. The enterprise system 50 supports the Common Gateway Interface ("CGI") as well as the server APIs of all major general purpose Web servers and all major browser technologies that are currently available.

The system manager 56 is connected to the Web server 52 through 'Capture Clients' (which is a software implementation). The Capture Client receives process request from the Web server and sends it to the system manager along with information required for the system manager to process the request. The Capture Client will send additional variables such as referring Web page URL, authenticated user, remote client name and other information that will be subsequently stored in the system to be available all throughout the application life cycle. To increase processing speed, all this information is not sent for application that is already running.

Several implementation of Capture Clients for different Web server API may be provided, along with a CGI-based Capture Client, which will work with any CGI-compatible Web server. The solution based on Web server API is much more robust, since it eliminates the need to start multiple CGI processes. The method of connection between the Web server and the system manager 56 is actually irrelevant to the applications, so it is possible to develop applications first with CGI and then move them to Web server API solution. It is also possible to switch Web servers without the need to recompile or modify any application code. The enterprise system manager 56 stores inside itself various tables of client and session information to match client requests with the running applications. The system manager 56 can run on the same computer as the Web server 52 or on a different one.

Application Server

The next important component of the enterprise system 50 is the application server. Typically, a number of application servers 58 are coupled to the system manager 56. The application servers 58 are software servers, which may be configured such that each application server 58 is installed in a separate hardware system, or two or more application servers 58 are installed in the same hardware system, or a combination of both configurations. The application servers may be configured to run in parallel or otherwise. By parallel, it means that each application servers 58 are configured to run independent of the other application servers 58, even though the application servers 58 are found in the same hardware system.

The application servers 58 are capable of running applications on remote computers and present a highly reliable and scalable system for deployment. Generally, the application servers 58 initiate, execute and manage each instance of an application 54 which physically resides on a particular application server hardware when multiple users "simultaneously" access an application. And when a new hardware server or application is added to the network, an application server (software) installed on this new hardware server automatically notifies the system manager 56 to optimize the use of available resources in the network. As a user's network expands with the addition of new machines, additional application servers can be acquired to automatically incorporate the servers into the system.

Upon startup, the application servers 58 read their configuration files to determine the location of the system manager and register themselves with it. The configuration files also describe which applications 54 this particular application server is configured to run. This information allows the system manager 56 to direct new users to the least loaded application server 58 in the system. The application servers 58 may be configured to run on multiple platforms, even within the single system. This allows the enterprise system 50 to combine applications developed for incompatible platforms under the homogeneously managed solution, providing the unified infrastructure for deployment.

When an application server 58 receives a request from a user to start a new application 54, it consults its configuration file and starts the appropriate process that contains the application code. All application interactions with the user are done through the special channels opened by the application server 58. The application server 58 also provides reliable storage for user data, received from the browsers. This data can be replicated between application servers 58, so that an application 54 can be restarted on another application server 58 in the event of hardware failure of the computer it is currently run on.

Application API

In order to provide developers of enterprise applications 54 with a simple and flexible means of developing Web applications running on multiple platforms, a set of APIs 60 has been adopted in the enterprise system 50. For each platform that the enterprise system 50 runs on, a version of such APIs 60 is created. All these APIs 60 maintain the same set of base functionality, which is expressed in terms of the target platform. This functionality allows the developers to extract data entered by the user into the Web page, store this information in the program variables and as a persistent context, and present newly generated data and pages to the user. Unlike existing methods of development of Web applications that require knowledge of particulars of CGI and HTTP implementations for a specific Web server, the APIs 60 in the enterprise system 50 hides these complexities from the developer and allows development of the Web applications in a cross-platform fashion. The net result of the enterprise system APIs is that it is only necessary for the developer to code the application logic in the back-end once, and any front-end user can access the application using a "dumb" interface without requiring another application program. The basic functionality of the enterprise system APIs 60 and the underlying principles of its functions are set forth below.

The enterprise system APIs 60 provide the communications between the application 54 and the application server 58. To deploy an application on the enterprise system 50, the developer needs to call the API functions to communicate with the application server 58. These communications include retrieval of the user-entered information, presentation of the new screens to the user and storage and retrieval of the user-defined context of the application. Additionally, the APIs 60 provide a means to deliver dynamically generated Embedded Objects, such as images, charts and applets. The description of the main functions of the APIs 60 is presented later below.

A special version of enterprise system APIs 60 is developed for each platform that enterprise applications 54 run on. These versions utilize specific protocols of the underlying platform and the operating system, however the functionality exposed to the user remains the same. Thus, a simple recompilation of the application 54 on the target platform will allow the enterprise application to be migrated to this platform. No code changes or usage of a different API is required. Because the APIs 60 are developed (e.g., by Unistra Technologies LLC) for a variety of programming languages under a variety of hardware and operating systems, developers with various skills could develop applications to be deployed under the unified infrastructure of the enterprise system 50. The use of such APIs, which may be part of a development kit for each language and platform, greatly reduces the training required to become fluent with the system, since the methodology of software development with the API's is familiar to most developers.

The API calls can be inserted into existing code in order to Web-enable it. All the program logic that existed and functioned in the present environment will remain the same, but the application 54 will produce the Web output and take the Web input. Because the application context is stored in the application server 58, the enterprise system APIs 60 can be used to store application specific information between the screens for multi-page interaction with the user. The screens sent by the application 54 are processed by application server 58 and receive additional information that would be required to process it when the user sends in the input. Additionally, to support rapid GUI development, the enterprise system 50 supports specialized screen definitions that allow programmers to develop applications operating on higher level of abstraction, dealing with just generic interface objects, such as 'button' or 'text box'. The application server 58 transparently handles substitution of correct markup language implementation of such objects and their values defined in previous interactions with the user. This may be accomplished by making use of the new screen definition language "UNML" described later below.

The major functionality of the enterprise system APIs are as follows:

Function: Char*AS_read
Parameters: char*block
Description: Returns the value of a user inputted variable.
Function: Int AS_back
Parameters: Int increment
Description: Indicates that the user has pressed a back button on the browser and return several screens back.
Function: char AS_pageid
Parameters: Void
Description: Returns the name of the current screen to identify the user location.
Function: int AS_write_begin
Parameters: Char*content_type; Char*page_id
Description: Sends a beginning of the new screen to the browser.
Function: Int AS_write
Parameters: Char*data; Int len
Description: Sends a screen portion to the browser.
Function: int AS_writeEmbed
Parameters: Int state; char*embed_name; char*data; int length
Description: Creates and initializes an embedded object.
Function: int AS_write_end
Parameters: Void
Description: Finishes the output and waits for the next user input.

Enterprise System Markup Language

A special screen definition language (Unistra Markup Language "UNML") has been developed which may be used advantageously for enterprise systems.

(a) General

UNML is designed to describe basic GUI elements (widgets) to be used to present information on wireless user interactive devices, such as PDAs, cellular phones, pagers, and other wireless devices. The basic GUI elements include:
text fields;
images (pictures);
input fields;
command buttons;
menus;
tables.

UNML is designed to be used in the internet/intranet applications using the enterprise system manager 56 and application servers 58 and UNML browsers. Communication between the application server 58 and the UNML browser is performed using HTTP protocol. UNML implements the "context free screen" concept, when every screen and every element of the screen is independent from other elements. Using the UNML, information can be transmitted to the users in a device independent fashion, so that transmitted information can be displayed on various wireless devices based on their unique browser. If the selectable screen element such as Menu Item is selected or if the editable screen element such as Input Field is edited, the value of the variable, assigned to this element is set and the variable is sent to the server using HTTP protocol.

UNML language is an embedded language. To comply with the HTTP protocol requirements the UNML screen definition page should be wrapped between standard HTML header, for example, containing the URL of the server application and standard HTML footer, for example. UNML allows one to create proprietary GUI applications (browsers) which are independent from the server application logic and use HTTP protocol as a communication protocol, but unlike standard WEB browsers, are optimized to be used with interactive server applications. By using a set of conversion rules, UNML can be converted "on-the-fly" to various browser screen definition languages, such as markup languages including "plain" HTML or HDML, so the same server application can use not only UNML browser, but other browsers, such as standard HTML or HDML browser, as its interface as well.

UNML introduces the "screen layout templates" concept, when the screen layout information is excluded from the data sent from the server to the client with every screen. Screen layout information can be saved in a separate local file and UNML browser can read that information to render the screen. Using screen layout templates allows optimization of the client-server communication and reduction of the network traffic.

It is helpful to explain the terminology referred to herein:

(i) Layout: the type of screen presentation that has its own behavior and rules for its population. Layouts are device independent, but their look and feel are device dependent in that they adhere to design characteristics and patterns specific to each device. Layouts might also have parameters, undefined until a template is created. Each Layout has a unique ID known by client and server. Examples: Table, Chart, PopUp, Form, etc.

(ii) Template: implementation of a layout. Each template also has a unique ID that allows gluing together the logic. A template is implemented by defining a layout it is based on, parameters of this layout and the controls that populate it. Examples: Order List, Quote, Order Executed Message (iii) Control: an element of the template. Control definition includes type, name and value. Additionally, each control has a default action flag (show/hide) when assigned to a template. Examples: Button, Table Row, Label (iv) Screen: a template populated with data.

The logic of the UNML implementation is generally as follows:

Predefined layouts are embedded into the front end (i.e., the UNML browser). Templates are created for each screen in the application and stored on the server in form of UNML files. The front end caches templates once it had seen them. When the front end requests a screen, the data for the screen is sent to the front end, and the front end presents the screen based on the template. When a new screen needs to be added to the application, one has to choose the layout, create a template, add logic to server code and add invocation of the screen into one of the controls. No modification of the front end is necessary, as long as there is an appropriate layout. New layouts can be added in the future versions of the front end.

If certain control needs to be hidden (or shown, if controls default state is hidden) because of certain data, the server can send a modifier to alter the control's behavior.

In order to save bandwidth, keyed field values are included into a template. For example, 'Trading' and 'Watchlist' account can be coded values of a control ColumnValue2 in template 'Account List'. Upon receipt of the first data element for this field, the front end will show 'Trading' in the cell.

It is also possible that a transition from one screen to another will happen entirely on the front end without request to the server. The server can request such transition, and the front end executes it if it has appropriate template cached.

Caching can be implemented either in a by session or a persistent basis, depending on the device's capabilities. In the by session caching the screens are only cached between logins. In the persistent caching, each cached template is assigned a timestamp and the templates, which were changed on the server, expire from cache at login time.

(b) Conversion

In order to convert a screen to a markup language such as HTML or HDML, the conversion rules replace the layout and each control in the template with appropriate statements in the target markup language. By implementing the set of conversion rules, each UNML GUI element or widget is converted into a tag or a set of tags in the target markup language and merged with a template in the target markup language to create a full screen, which is rendered by the browser that is compatible with the target markup language.

By way of example and not limitation, the conversion of UNML to HTML is possible by using HTML layout templates. They contain regular HTML tags and placeholders. The following describes the format of these placeholders:

{<Type>=<FormID>:<ControlID>[Options]}

1. Currently the following types are supported:
DISPLAY—a plain text line
ENTRY—an entry field
MULTILINE—a multiline entry filed
CHOICE—an options list
RADIO—a radio button with horizontal representation if more than one choice available
VRADIO—a radio button with vertical representation if more than one choice available
DATABLE—a table's row, which can contain links.
TEXTTABLE—the same as above, w/o links
CELL—a table cell
BUTTON—command button 2. FormID and ControlID describe the corresponding GUI element, which is defined in the UNML template. They are separated by ':' (column). FormID is a number (ID of the form). ControlID is either a number (ID of the control itself) or a name the corresponding UNML control, which will contain the value when the form is submitted.

3. The Options can contain additional attributes of the HTML tag. For example [VALUE="Submit The Order"] option is used with "BUTTON" type and assigns a new label of the button control.

EXAMPLES

DISPLAY.

The following will display the text with ID=1, defined in form 220
<B>{DISPLAY=220:1}</B>

ENTRY:
<P><B>Condition:</B>{ENTRY=111:condition}</P>

(See FIG. 8a for display.)

MULTILINE:
<P>Comments:<BR>{MULTILINE=111:r_comments [COLS=30]}</P>

(See FIG. 8b for display.)

CHOICE: <P><B>Order Type:</B>{CHOICE=112:order_type}</P>

(See FIG. 8c for display.)

RADIO:
<P><B>Order Type:</B><BR>{RADIO=110:order_type}</P>

(See FIG. 8d for display.)
VRADIO: <P><B>Order Type:</B>{VRADIO=110:order_type}</P>

(See FIG. 8e for display.)

DATABLE:
<TABLE BORDER=1>
   <TR>
     <TD>Name</TD>
     <TD>Type</TD>
     <TD>Value</TD>
     <TD>Sec Value</TD>
     <TD>Cash Value</TD>
     <TD>Loan Rate</TD>
     <TD>Buying Power</TD>
     <TD>Money Market</TD>
     <TD>Action</TD>
   </TR>
{DATABLE=102:portfolio}
   <TR>
     <TD>{CELL#0=102:1"USER1"}</TD>
     <TD>{CELL#1}</TD>
     <TD>{CELL#2}</TD>
     <TD>{CELL#5}</TD>
     <TD>{CELL#8}</TD>
     <TD>{CELL#11}</TD>
     <TD>{CELL#14}</TD>
     <TD>{CELL#17}</TD>
   </TR>
{/DATABLE}
</TABLE>

(See FIG. 8f for display)
BUTTON: {BUTTON=102:1"USER2"[VALUE="Add New Portfolio"]}

(See FIG. 8g for display.)

The foregoing illustrates the example of how UNML may be converted to HTML. Conversion of UNML to other markup languages may be implemented following a similar approach by one skilled in the art.

(c) UNML Language

Basic UNML language element is the GUI element definition triplet enclosed in the square brackets:

Triplet=:[{Type}:{Name}:{Value}]

where:
   Type is UNML code defining the GUI element;
   Name is any text or binary value to show on the screen;
   Value—optional field, containing text or binary value and defining default value of the element or return code, if the element is selected.

Parts of the UNML triplets are separated by the ':' (column) symbol. If Name or Value fields contains column symbols, these symbols should be "escaped" by the '\' (backslash) symbol. The meaningful backslash symbols should be "escaped" too.

UNML Type is 8-digits numeric value, composed of the four 2-digits components:

Type =:{Main type}{Subtype}{Command}{Format}

Main types, currently supported by UNML:
Screen;
Text;

Numeric field;
Image;
Input field;
Command button;
Menu;
Delimited text.

Subtypes, currently supported by UNML:
Prompt (for the Main type of Text);
Entry format (for the Main type of Input field);
Menu Item Value (for the Main type of Menu);
Menu Item Index (for the Main type of Menu);
Menu Item (for the Main type of Menu);
Menu Command Item (for the Main type of Menu);
Integer Format (for the Main types of Input field and Numeric field);
Float Format (for the Main types of Input field and Numeric field);
Fractions Format (for the Main types of Input field and Numeric field);
32-nd Fractions Format (for the Main types of Input field and Numeric field);
Table Column Names (for the Main type of Delimited text).
Formats, currently supported by UNML:
Line;
Wrap;
Left;
Center;
Right.

(d) Defining a Screen Using UNML

UNML screen definition usually contains:
HTML header with the server application URL;
optional screen identification triplet, which can be used by the UNML browser to define a screen title and load screen layout template;
set of GUI elements triplets;
HTML footer.

<HTML>
<A HREF="Server Application URL"></A>
[Type_screen:screen_name:screen_id]
[Type:Name:Value]
. . .
[Type:Name:Value]
</HTML>

(e) Defining GUI Element Using UNML

Defining different GUI elements require different number of UNML triplets. In addition, some GUI elements require Value component of a triplet and some—not.

i. Text Fields

Text field definition consists of one triplet. Text field triplet Type part allows specifying Subtype of Prompt and any of the supported Formats. Text field triplet does not require a Value part.

ii. Numeric Fields

Numeric field definition consists of one triplet. Numeric field triplet Type part allows specifying datatype Subtype (Integer, Float, Fraction or 32-nd Fraction) and any of the supported Formats. Numeric field triplet does not require a Value part.

iii. Image

Image definition consists of one triplet Image triplet Name part should contain the title of the image and Image field triplet Value part should contain the path to the image file on the server.

iv. Input Field

Input field definition consists of one triplet. Numeric field triplet Type part allows specifying data type Subtype (Integer, Float, Fraction or 32-nd Fraction) and any of the supported Formats. Input field triplet Name part should contain the name of the server variable in which the value will be stored. Input field triplet does not require a Value part, but if the Value part is supplied, it is used to set the initial value of the variable, specified by the Name part of the triplet.

v. Command Button

Command button definition consists of one triplet. Command button triplet Type part should contain Command component set to 01. Command button triplet Type Subtype and Format components are ignored. Command button triplet Name part should contain the name of the button. Command button triplet Value part should contain the action code (unique in the scope of the screen) which will be returned to the server, if the button is pressed.

vi. Menu

Menu definition consists of multiple triplets in the following order:
Menu Name Definition Triplet
Menu Item definition triplet
. . .
Menu Item definition triplet vii. Menu Name Menu Name definition triplet Type part allows specifying Subtype of Menu Item Index or Subtype of Menu Item Value. In case of specifying Subtype of Menu Item Index the sequential index (starting with 1) of the Menu Item will be returned, if the Item is selected. If the Subtype of Menu Item Value is specified, the Value part of the Menu Item triplet will be return, if the Item is selected. Menu Name definition triplet Name part should contain the name of the server variable in which the value will be stored. Menu Name definition triplet Value part is used to define the default Menu Item.

viii. Menu Item

Menu Item definition triplet Type part should have Main type of Menu and Subtype of Menu Item or Menu Command Item. Menu Item definition triplet Name part should contain the name of the Menu Item to be shown. Menu Item definition triplet Value part is optional, if Menu Name triplet Type part has a Subtype of Menu Item Index and is required, if Menu Name triplet Type part has a Subtype of Menu Item Value. In case of Subtype of Menu Item Value Menu Item triplet Value part should contain the value, which will be stored in the variable, specified by the Menu Name triplet Name part, if this item is selected.

ix. Delimited Text

Delimited text definition consists of one triplet. Delimited text triplet Name part should contain the text, delimited by "tab" and/or "new line" symbols. Delimited text triplet does not require a Value part.

An example of the UNML screen definition with UNML "wrapped" between HTML header and footer to comply with HTTP protocol is as follows:

<HTML>
<A HREF="/cgi-bin/wrql/cc.dev/wtrade_cpp_html/00000000002302000W-trade/ID=5"></A>
[05040000:Menu:1]<BR>
[05060000:Accounts:13]<BR>
[05060000:Place order:14]<BR>
[05060000:Get quote:15]<BR>
[05060000:Order list:16]<BR>
[05060000:Event list:17]<BR>
[05060000:Notifications:18]<BR>
[05060000:Alerts:19]<BR>
[05060000:Look up:20]<BR>
[01000011:1:Account\:098-05007]<BR>
[05110000:Symbol Type Value $:]<BR>

[05030000:security:MSFT|1]<BR>
[05050000:MSFT Stock 86250.000 MSFT—MICROSOFT CORP
Quantity 1000
Total value $86250.000:MSFT|1]<BR>
[05050000:NSCP Stock 18093.750 NSCP—NETSCAPE COMMUNICATIONS CORP
Quantity 750
Total value $18093.750:NSCP|1]<BR>
[04000100:Get quote:3]<BR>
[04000100:Allocation:4]<BR>
[04000100:Place order:5]<BR>
</HTML>

Figure 6:
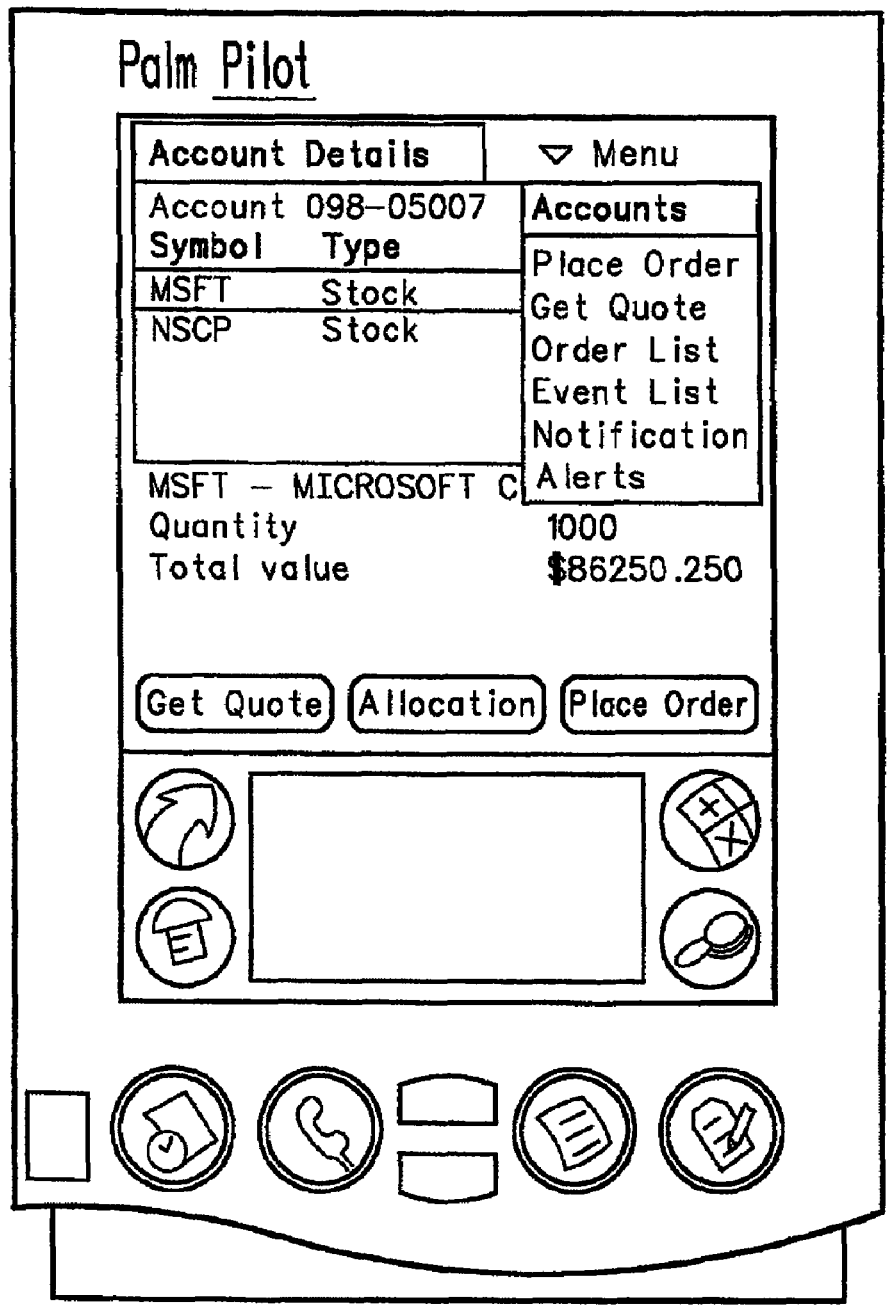
FIG. 6 and FIG. 7 show exemplary actual screen displays at a user interactive device, of information that is transmitted in accordance with the UNML screen definition of the present invention.
Figure 7:
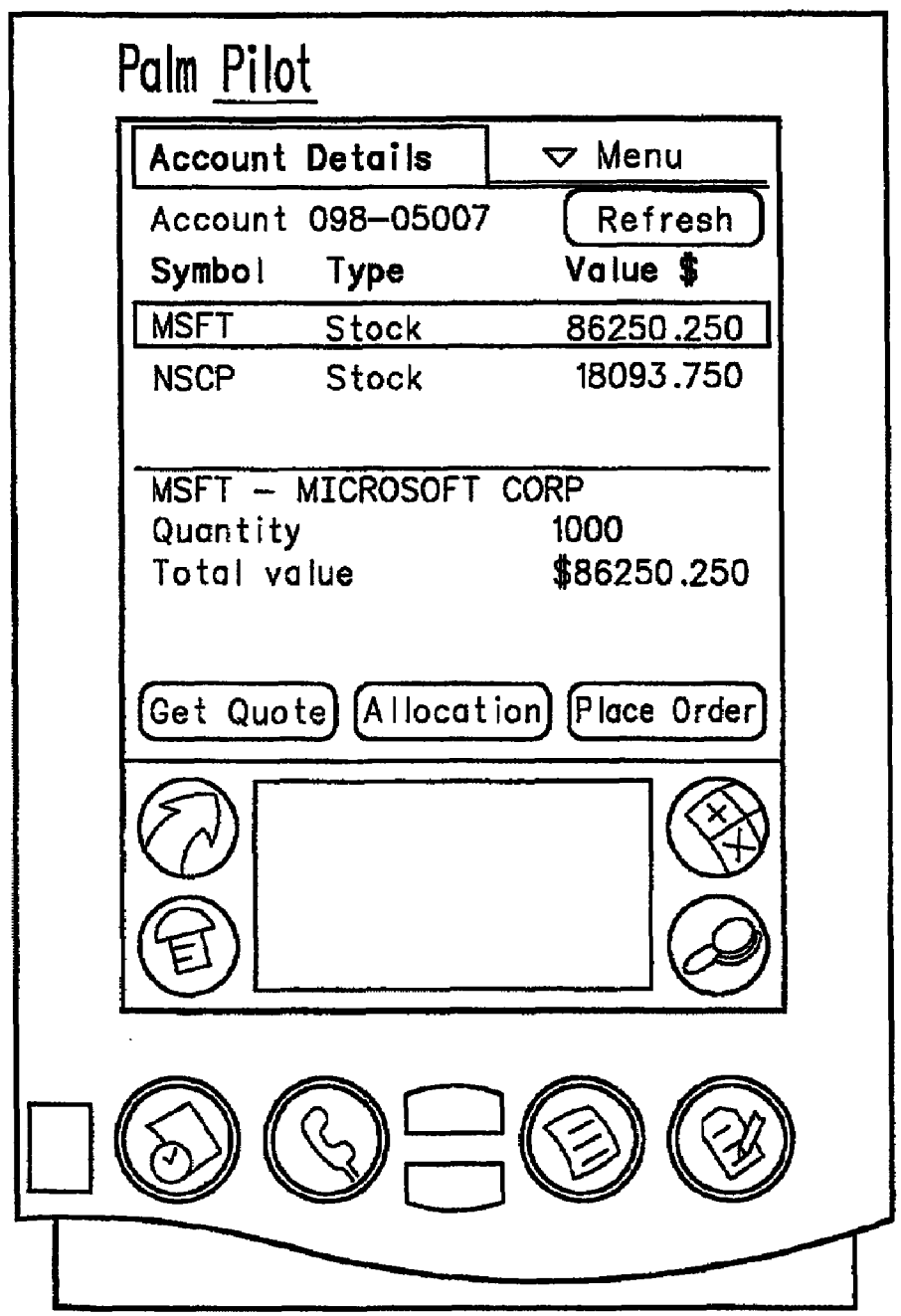

FIG. 6 and FIG. 7 are actual screen displays for the "PalmPilot" PDA device (by U.S. Robotics) corresponding to the UNML screen definition given above.

Deployment Options

As previously mentioned, it is possible to deploy the enterprise system 50 in various combinations on multiple platforms. More specifically, some most common deployment options for various levels of system uses are as follows:

a) Entry-Level Configuration

This configuration runs all system components on the same computer. It is possible to use the same computer as the Web server 52 is running on, making initial hardware costs minimal. In this case only one application server 58 is running in the system.

b) Advanced option in Homogeneous System

This configuration is used when multiple application servers 58 are required because of increasing load. In such configuration each additional computer contains an application server 58 with its own configuration file, that determines which applications it is capable of running. This computer should also contain the application code that will be invoked by the application server 58.

c) Advanced Option in Heterogeneous System

This option should be used when inter-related applications on multiple platforms are deployed in the same architecture. For example, a Visual Basic application has been developed using the development kit for Visual Basic and another application has been developed under the C++ system. Both applications can be seamlessly integrated at the deployment stage under the same architecture.

d) Advanced Option Over the Firewall

The enterprise system 50 can be configured to run securely through a network system firewall, so that the Web server 52 which is running on an external network is accessing the system manager 56 running within the firewall as a specialized proxy. The application servers 58 in this configuration are running inside the firewall securely accessing the proprietary databases in a controlled environment. This way, there is no need to move data outside the firewall, thus eliminating possible costs of data synchronization.

In the Advanced configuration option, multiple application servers are running on multiple hardware servers connected to a network. The system manager distributes the load between these application servers. Each application server can run multiple instances of multiple applications. In addition, application servers can run on various hardware and software platforms simultaneously, including platforms that are incompatible with each other.

Application Development

The enterprise system's unified architecture provides a way to quickly and cost-effectively develop large scale IP network systems that can handle the most complex applications and any number of users. Unlike other software infrastructure products, the unified architecture offers a familiar application development environment where programmers can work with the languages and programming methodologies they already know. Rather than forcing programmers to learn unfamiliar and difficult proprietary languages, or limiting the user base to those familiar with object-oriented programming, the unified architecture's infrastructure enables programmers to develop large-scale IP network applications the way they have been developing other applications. This eliminates re-training and reduces both development and maintenance costs, while allowing rapid application deployment. Since the unified architecture provides enterprise-class application availability, performance, and scalability, companies can now leverage their existing business-applications and business knowledge to create the high-value, strategic Web Systems, Intranets, Extranets they need for rapid business growth. In addition, the unified architecture delivers lower deployment costs, reduced system administration expenses, and improved overall system performance.

To further facilitate development of new applications, or incorporation on previously developed application, written in any existing language, software development kits may be developed for C, $C^{++}$, Java, PERL, COBOL, FORTRAN, and RPG, as well as visual tools.

Report Query Language ("RQL")

A new programming language has been created to make it significantly easier to develop new applications, e.g., for use with the enterprise system 50 in an IP network environment.

The Internet has created a demand for new classes of tools that let programmers build many different types of applications which work with existing (legacy) systems and data—without having to learn complex, proprietary languages and without having to change they way they currently work. RQL is a high-level platform independent programming language specifically designed to address the challenges of creating complex system, database and network administration applications, as well as database applications and enterprise wide reporting applications for "traditional" client/server, IP network and Internet/Intranet environments. RQL also includes extensions that allow developers to rapidly create state-of-the-art IP network, such as Internet, applications for Intranets and Web sites. This includes corporate reports, on-line databases and catalogues, and content rich Web sites. A "run time engine" ("RTE"), and various "software development kits" ("SDK"s) are also available for RQL.

RQL Features

Unlike like many Internet-centric application development tools emerging today, RQL is a robust and flexible technology addresses application development issues equally well in both client/server and Internet/Intranet environments. This is because RQL is not an existing tool that has simply been adapted for use in the Internet/Internet environment, like many others. RQL uses a simple but flexible syntax based on familiar grammar (so the learning curve is minimal). However, it is also robust and flexible enough to allow programmers to implement the same, extensive functionality as they can now implement only by using other, more cumbersome general purpose languages.

Also unlike other application development tools, RQL provides programmers with straightforward ways to incorporate legacy code, custom libraries and additional programming in other languages into their web applications—quickly and easily. It is one of a small number of tools that are based on and integrate with industry standard languages, and the only one of its kind to utilize a C based API, and allow programmers to merge legacy code with product code, and vice versa.

In addition, RQL applications can be deployed with virtually all major database management systems including Oracle, Sybase, Informix, Computer Associates (Ingres), and Microsoft's SQL Server. RQL's cost-effectiveness is enhanced by Data Sources that enable access to data from all kinds of relational and non-relational databases. Data Sources are available for databases from Sybase, Oracle, Informix, and Microsoft, and other Data Sources to meet the particular needs of vertical markets (for example, Bloomberg and Telerate data feeds for the financial industry, and SABRE for the travel industry.)

RQL is designed to support all major proprietary web server interfaces such as Microsoft's ISAPI and Netscape's NSAPI, as well as the standard Common Gateway Interface, so it can be deployed with any web server. Various SDKs will allow programmers to build new applications or reuse legacy code written in virtually any standard programming language, including C, C++, PERL, Java, Visual Basic and others.

RQL Functions

RQL is a new, high-level programming language that allows programmers to rapidly create complex database applications and reports in the client/server environment—without having to code the extensive data manipulation logic necessary with other commonly used general purpose languages. RQL provides a programming environment similar to C, C++ and PERL. However, RQL extends these languages to enable the application developer to easily manipulate and format relational data that is accessed using standard SQL. At the same time, RQL is simpler to use because it incorporates only those constructs that are required for robust data access and data manipulation. RQL is an exceptional tool for creating sophisticated applications, data manipulation programs and complex, enterprise-wide reports.

Since RQL uses a simple but flexible syntax based on familiar grammar, the learning curve is minimal. Any database application developer can program in RQL from day one. Yet, RQL's robust features allow the developer to implement the same functionality as any other general purpose language. The language also provides the developer with compact and straightforward ways to implement tasks that incorporate legacy code, custom libraries and additional programming in other languages—quickly and easily.

RQL is based on the ANSI-89 version of SQL. ANSI-92 compliant version may be developed. RQL includes native drivers to most popular relational databases so developers can access multiple database engines in the same program. Since RQL is based on a common standard, it's easy to write platform-independent programs can be easily migrated from RDBMS to RDBMS ("relational database management system").

RQL includes extensions that allows developers to rapidly create state-of-the-art Internet applications for Corporate Intranets and Web Sites—including corporate reports, on-line databases and catalogues, and content rich Web Sites. RQL works with any Web browser, and programs developed in RQL will run on virtually any industry-standard Web Server. Since RQL is self-contained, complete RQL applications can be packaged for distribution throughout an organization. Also, commercial developers can create vertical market applications for resale, if desired.

In addition, a significant advantage of RQL over other general purpose languages is that it eliminates the need for direct programming of CGI scripts and Web Server API's. RQL is designed to work with standard CGI and most major Web Server interfaces (for example, NSAPI, ISAPI).

With general purpose programming languages such as C or PERL, programmers have to work with particulars of a specific database API, including conversion of data types, handling NULL values and so forth. Even in more advanced object-oriented languages, such as Java, C++ or PERL, the class libraries designed to hide the complexities or the API's, do not actually simplify the processing and grouping of records that are present if every data processing application. RQL solves these problems in a consistent and transparent manner and provides programmers with a light and simple environment. Based on the fact that C is the most popular programming language in the client/server environment, RQL syntax is very similar to ideas found in C. As such RQL contains all required data flow statements like if, while and for, functions, variables and other elements typically found in a procedural language. Additionally, to improve text processing, RQL features standard-based pattern matching and string parsing operators that are similar to those found in PERL.

Unlike PERL and like strong-type programming languages, RQL does not allow operations on variables of incompatible types. This feature significantly simplifies run-time debugging of programs written in RQL. All of RQL data types have been designed and optimized to provide the programmer with powerful, yet easy to use tools for working with text and data. All database values are mapped to RQL types automatically and are accessible to the programmer immediately upon retrieval like other RQL variables. The NULL, or 'undefined', type is a native RQL type, allowing correct exchange of data between the database and the application.

Data Source and Data Iterator

To process data from external sources RQL introduces two very important concepts: Data Source and Data Iterator. Data Source is actually any external database or data feed. RQL communicates with Data Sources in a consistent manner through drivers (e.g., distributed by Unistra Technologies, LLC). From the program standpoint, the syntax to call a Sybase database will look the same as to open a flat file. However, unlike ODBC (Open Database Connectivity), RQL not only allows the programmer to use native language of the Data Source, but allows to access Data Sources that have no ODBC drivers.

RQL also allows access of extensions in the Data Sources that are not available through ODBC since all exchange is performed through native Data Source drivers. Currently, most relational databases, basic networking and some vertical market data feeds are supported as Data Sources. Driver may be developed for OLE, CORBA, SNMP and other distributed protocols to enable rapid development of light and easily understandable programs communicating with such Data Sources.

Another innovation of RQL is Data Iterator, which serves as the basis to processing of data received from any Data Source. Data Iterator contains components that handle processing of individual records and record groups, providing programmers with a combined declaratively-procedural interface to data processing. The foundation of this approach is that the programmer defines a block of RQL operators to process records and groups, as well as conditions, such as no records in the set or group, beginning or end of processing group, beginning or end of the data set. Everyone who had experience writing purely procedural reports in PERL or C knows that this is the most tedious and error-prone part of the job.

Additionally, RQL provides functionality that reduces the amount of code the programmers have to write while processing record groups, by allowing definition of aggregate statements. Those aggregate expressions are calculated automatically and allow incorporation of arbitrarily complex RQL code. The amount of code the programmer has to write is decreased significantly and the code becomes simpler and easier to maintain.

To output the result of the calculations RQL uses output templates. Those output templates allow any kind of information to be sent to standard output, including HTML, plain text and other markup and type-setting languages. RQL also uses the same output template to send data to Data Sources, but the rules of data formatting are different. Output templates are generally defined to run over Data Sources, therefore by opening a connection to Sybase one can use Data Iterator to read data from the Data Source and output template to send data and command to it. RQL also contains Data Source Drivers specifically designed to data load into Data Sources, which makes it very useful for loading large amount of information that is collected from multiple sources.

In a single RQL programs, multiple connection to multiple Data Sources can be used simultaneously, so there can be an application that connects to Sybase and some financial data feed and produces an end-of-the day portfolio report with the latest data that is coming from the feed combined with the account information in the Sybase database.

Data Warehouse users can find RQL very useful in extracting and loading data. Support for multiple database and platforms makes development easy and does not require intermediate files and data conversion between programs. Native support for database types ability makes it more straightforward to move data from source database to the warehouse and group processing make summary calculations pretty straightforward.

RQL programs can also be developed on one platform and deployed on many others. RQL code is platform independent and can be either processed in text form by RQL interpreter or compiled into RQL object code to be processed by RQL run time engine.

RQL Run Time Engine ("RTE")

The RQL RTE runs database applications and reports over Intranets and Web sites. The RTE takes the code of a precompiled RQL application and executes it in a multithreaded environment that facilitates database access—and provides high performance with excellent response times. Each RQL program runs in its own secure thread, so corporate data and commercial Internet transactions are protected.

For further details of the RQL, a copy of the "Request Query Language Reference Guide" for the RQL software product distributed by Unistra Technologies, LLC is attached as Appendix A, and documentations relating to various examples of Data Sources (including "RQL File Data Source", "RQL ODBC Data Source", "RQL Process Data Source", "RQL Socket Data Source", "RQL Sybase Data Source", and "RQL Sybase BCP Data Source") are attached as Appendix B. These Appendices are fully incorporated by reference herein.

IP Network Based Trade System

Referring now to FIG. 4, the IP network based trade system 20 described in connection with FIG. 2 may be implemented with the unified architecture of the enterprise system 50 above. The trade system 20 consists of a trade system manager 62, one or more trade application server 64, and one or more trade application 66. The trade system manager 62 corresponds to the system manager 56 in FIG. 3. The trade application servers 64 correspond to the application servers 58 in FIG. 3. The trade applications 66 correspond to the application 54 in FIG. 3. The trade system manager 62 and the trade application servers 64 have similar generic system characteristics and functions as those of the enterprise system manager 56 and application servers 58 discussed before (e.g., the trade system manager has the same Capture Client function), except that the specific information and transactions being handled by the trade system specifically relate to financial trading in this embodiment. A trading database 68 may be provided in addition to any proprietary databases 70 associated with the existing trade execution system 22. For systems with a trade alert function, an alert system 72 is provided in the trade system 20.

Trade System Manager; Trade Application Servers

The trade system manager 62 brings order and logic to busy Internet trading environments by binding together all system components and connecting unconnected "hits" from each trader into a single session. It also provides load balancing and high availability by routing traders to the least busy trade application server 64. The trade application servers 64 accommodate the simultaneous trading activities of an unlimited number of traders by managing instances of the trade application 66 as required for each. Any number of trade application server 64 can be transparently added, on the fly, for complete scalability. Each application server 64 may be provided with an API 65, which is used to couple to any existing trade applications without the need to modify the latter.

While FIG. 4 shows one trade system manager 62, more than one trade system managers may be provided, each coupled to a group of trade application servers 64.

Trade Applications

Each trade application 66 contains one or more specific functions that process the traders' requests received over the Internet. Referring to FIG. 5, these functions may include interfacing functions such as: trader setup and configuration (block 80), coordination of interactions of the trade execution system 22 and the transaction requests from users received through the network 25; information delivery from the trade execution system 22 to the traders; trader login (block 82) (which may include encryption, trader authentication, trader account verification, and other trader/account specific functions); identification of user requests; and routing of user requests to the appropriate trade execution system 22 (if there is more than one). The trade applications 66 also include trade modules which perform trade specific add-on functions or shell functions that are not found in the trade execution system 22, including the following function categories: management (block 84), place orders (86), order status (88). Within each category, there may a series of functions and sub-functions that are specific to trading, which are exemplified in FIG. 5. The trade applications 66 may be developed using the RQL discussed above.

Trade Alert

The trade alert system 72 is a dedicated trade application. Referring to FIG. 5, it may include both alert messaging (block 90) and order confirmation (block 92) functions.

Independent of any request on demand by the trader, the trade alert system 72 initiates a dial out to the cellular phone (or other types of interactive devices) of specific trader or traders to alert them to, for example, trading price fluctuations, or simply to report information and news which the traders subscribed to (i.e., information the trader requested the trade system 20 to provide on a regular basis or when available basis). Depending on the device, the alert system formats the alert information in UNML, HTML and/or HDML, and sends it via the Web server, the Internet, and the wireless gateway to the traders' wireless device (e.g., a cellular phone, pager, etc.). The alert is displayed on the screen of the trader's wireless device. The traders can react immediately to the alert by pressing one or more buttons, for example, to request a trade. For example, as the alert is displayed on the screen via the built-in browser of a trader's cellular phone, the browser also displays graphics or menu driven menu prompts for the trader to select an action in response to the alert. The available prompts may represent a buy-request, a sell-request, a clear-screen request, and other user-friendly prompts. The trader only needs to move a cursor and/or press the corresponding number button or softkey to activate the desired action associated with a desired prompt. There may be one or more additional levels of prompts before the trader's request is sent from the trader's cellular phone (e.g., a confirmation prompt for the trader to confirm a sell or buy request before such request is sent). The trade system is configured to interface with the trader's existing interactive device in a manner such interface may be fully configurable to meet the requirements of any trading system implementation. It is understood that similar or different configurations may be implemented on other types of wireless devices to accomplish the Trade Alert function and trader's response without departing from the scope and spirit of the present invention.

Trade Confirmation

A confirmation function for reporting the status of the trader's request may be built into the trade alert system 72 or in a separate system. Immediately upon completing execution of a trade request by the trade execution system 22, the trade is confirmed by the trade alert system 72 in a brief message via email, voice mail, code paging, or the like messaging to the trader's wireless device. Further, depending on the configuration initially set by the trader, a full report concerning the trade may be sent to the trader's designated email addresses and/or fax numbers, which may include a receipt, invoice, account statement, etc. The trader has the option to receive the full report on the spot using the wireless device if so desired.

Further, the trade system 20 may include the feature for allowing the trader to customize the browser format and functions to suit the trader's personal preference, including configuring user setup with respect to the desired access security level, alert subscription and preferences, confirmation preferences, and other preferences for interfacing with the trade system 20. Details of possible browser functions are omitted herein, as they can be easily devised without undue experimentation to suit ease and convenience of use of users.

Trade Application API

In order to facilitate quick and consistent integration of trade system 20 with the existing trade execution systems 22, well-defined APIs are used for coupling the trade application 74 to the trade execution system 22. These APIs avoids the need to modify the functionality of the trade execution system 22. At a system level, the manner of access to the trade execution system 22 (e.g., by wired or wireless network) is indistinguishable to the trade execution system 22. Such approach allows integration with virtually any existing trade execution system 22 on practically any platform. Specifically, two separate API systems are created: a trade execution API ("TE API") 74 and a trade alert API ("TA API") 76. The TE API 74 provides the functionality of delivering trade information and trader requests to the trade execution system 22 and the TA API 76 allows the trade execution system 22 to deliver real-time trade information to the trader. The cooperation of the two types of APIs with the trade system's core functionality provide an extremely flexible and secure way to implement two-way communication without actually modifying the trade application itself.

The TE API 74 allows delivery of trade information and trader requests from a trade application to a trade execution system 22 maintained by a company. It provides stubs, or hooks that are called at predefined moments in various steps in trade processing by a Core Trade Processing (CTP) module located in the trade application 66. These stubs have to filled with code that actually performs the interface with the trade execution system 22. The code is customer dependent and is implemented during the integration phase.

Such an architecture provides significant advantage because the CTP code does not have to be modified during the integration phase. The TE API 74 functions provide all the necessary information for the CTP to present to the user and to deliver information to the execution system. TE API 74 functions include Portfolio Management, Order Management, User Authentication, Quote Interface and Event Subscription subsystems. These subsystems can interact with different components in the Execution System and in conjunction with the TA API provide full two-way interaction between the user and the Execution System. Major functions and their descriptions are provided in the following table:

| Subsystem | Function Name | Description |
| --- | --- | --- |
| User Authentication | WTE_user_auth | Verifies validity of user/password combination |
| User Authentication | WTE_user_register | Registers the user in the execution system |
| User Authentication | WTE_change_password | Modifies user password in the execution system |
| User Authentication | WTE_get_user_info | Retrieves information about user |
| Portfolio Management | WTE_get_portfolio_list | Get list of user's accounts |
| Portfolio Management | WTE_get_default_portfolio | Retrieves user's default account |
| Portfolio Management | WTE_change_default_port | Changes user's default account |
| Portfolio Management | WTE_get_security_list | Retrieves list of securities in the account |
| Portfolio Management | WTE_add_to_portfolio | Adds a security to a watch list |

-continued

| Subsystem | Function Name | Description |
|---|---|---|
| Quote Interface | WTE_get_market_info | Retrieves current information about the market conditions |
| Quote Interface | WTE_is_market_time | Checks if the security is currently traded |
| Quote Interface | WTE_get_quote | Get current market quote for a security |
| Quote Interface | WTE_security_lookup | Ticker lookup by company name |
| Order Management | WTE_post_order | Send an order to the execution system |
| Order Management | WTE_cancel_order | Send a cancellation request to the execution system |
| Order Management | WTE_get_order | Retrieve order information from the execution system |
| Order Management | WTE_get_user_pending_order_list | Retrieve the list of pending orders for the user |
| Order Management | WTE_get_user_hist_order_list | Retrieve the list of transactions for the user |
| Order Management | WTE_gel_port_pending_order_list | Retrieve the list of pending orders in the account |
| Event Subscription | WTE_get_event_list | Retrieve list of events registered for user |
| Event Subscription | WTE_add_event | Registers an event |
| Event Subscription | WTE_get_event_info | Retrieves information about the event |
| Event Subscription | WTE_modify_event | Updates modified event with new information |

The TA API 74 allows asynchronous delivery of real-time information to the user device from the Execution System. It is implemented as a library of functions that are called by an Alert Daemon located in the alert system 72 or the trade execution system 22 itself when a portion of information has to be delivered to the user. Since such information may be of different type, TA API 76 contains various subsystems for handling specific types of alerts. These subsystems include Trade Confirmation, and Custom Information subsystems. Major functions and their descriptions are provided in the following table:

| Subsystem | Function Name | Description |
|---|---|---|
| Trade Confirmation | WTA_confirm_order | Sends order confirmation information to the user |
| Trade Confirmation | WTA_reject_order | Notifies the user that the order was rejected by the execution system |
| Trade Confirmation | WTA_cancel_order | Notifies the user that the order was cancelled by the execution system |
| Custom Information | WTA_send_alert | Sends a simple alert to the user |

An important feature of TA API 76 is its security, which is important since sensitive information is delivered asynchronously to a user device. For each alert, only the type and its title are actually delivered to the user, while the full content stored in the trading database and are only revealed to the user after his/her logging into the trade application. This prevents sensitive information from being revealed accidentally when the device is out of the owner's hands.

When the trade system 20 is being integrated with a particular trade execution system 22, the programmer will use a library of CTP and TA modules, and a file with TE function stubs. Those functions will be delivered may be found in a single file and will have no code in them. The programmer working on the integration will write the actual code for the integration with particular trade execution system 22. Additionally, a sample makefile is included in the package. This makefile can be modified with the additional parameters necessary for successful compilation of the integration code. The functions will be called at the appropriate time during trade processing, and the returned results will be used by CTP to notify the user about the status.

Since several popular trade execution systems 22 and platforms currently exist in the marketplace, a number of prepackaged implementations of TE and TA APIs may be developed and prepackaged, so that no coding will be required during the integration process. This follows the principles of the enterprise system and its APIs. For those using an execution system that a prepackaged implementation has been developed, they can simply install the implementation and configure it to match with parameters of the actual installation of the trade execution system. Such turnkey configuration will significantly decrease cost of entry and integration time for the customer.

An example of a trade system that has been implemented in accordance with the present invention is the w-Trade Wireless Internet Trading System distributed by w-Trade Technologies, LLC for use with digital cellular phones, for example, and other digital user interactive devices. A copy of the User Guide (V. 2.0) for the w-Trade system is attached hereto as Appendix C. This Appendix is fully incorporated by reference herein.

Embodiments of the present invention provide an add-on transaction system that interfaces a network of users with an existing on-line transaction execution system, without requiring significant modifications to the functionality and/or protocol of such transaction execution system. This is accomplished by providing a set of novel application programmer interfaces (API) which allows integration of specific transaction applications within the transaction system with virtually any existing transaction execution system on practically any platform. More specifically, two separate APIs axe provided, a "transaction execution" API ("TE API") and a "transaction alert" API ("TA API). The TE API provides the functionality of delivering trade information and user requests to the execution system, and the TA API allows the execution system to deliver real-time information to the user. The cooperation of the two APIs with the transaction system's core functionality provides an extremely flexible and secure way to implement two-way communication without actually modifying the transaction application itself. In another aspect of an embodiment of the present invention, the transaction system is implemented to receive user transaction requests via IP networks (such as the Internet which uses the "transmission control protocol/Internet protocol" ("TCP/IP"). In a further aspect of embodiments of the present invention, the transaction system is implemented to receive transaction requests via a wireless gateway, and more specifically via a digital packet-switched wireless gateway, which may be connected via the IP network to the transaction system. In a specific embodiment of the present invention, a financial transaction system is disclosed. According to yet another aspect of embodiments of the present invention, an enterprise system having a novel unified architecture is disclosed which maybe adopted for the IP network-based transaction system of an embodiment of the present invention. The enterprise system makes use of a set of APIs that renders the enterprise applications platform independent. The enterprise system consists of an enterprise system manager and a number of application servers. The application servers are capable of running applications on remote computers and present a highly reliable and scalable system for deployment. The system manager tracks and provides an "application state" in each instance of the application programs running on the distributed application servers, even though the necessary data is received as a senes of unconnected "hits" in the IP network environment. The system manager unites information and applications residing on the different application servers within the otherwise unstructured IP network environment, so the applications work together seamlessly and efficiently, even if the types of application servers and related databases in the system are not compatible. In a further aspect of the enterprise system, a special screen definition language ("UNML") has been developed to describe basic GUI elements such as text fields, images, input fields, command buttons, menus and tables. This is an embedded language that implements the "context free screen concept", where every screen and every element of the screen is independent from other elements. Using the UNML, information can be transmitted to the users in a device independent fashion, so that transmitted information can be displayed on various wireless devices based on their unique browser. According to yet another aspect of an embodiment of the invention, a new, high level programming language, the Report Query Language ("RQL") provides a programming environment similar to C, C++ and PERL, but makes it more convenient for programmers to manipulate and format relational and non-relational data. RQL also includes extensions which allow developers to rapidly create state-of-the-art Internet applications for Intranets and Web sites. A run time engine, and various software development kits are also available for RQL. RQL therefore simplifies the development of complex system, databases and network administration applications, as well as database applications and enterprise wide reporting applications for "traditional" client/server and Internet/Intranet environments. RQL maybe used to develop the transaction application of various embodiments of the present invention.

The systems of the present invention have been described above in terms of functional modules in block diagram format. It is understood that unless otherwise stated herein, one or more functions may be integrated in a single physical or software module in an actual implementation, or a function may be implemented in separate physical or software modules, without departing from the scope and spirit of the present invention.

Further, unless other stated herein, the actual implement of each functional module taken alone does not form part of the invention. It is appreciated that detail discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the systems. A person in the art applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the inventive concepts herein may be applied to design a wired or wireless system, based on the Internet, IP network, or other network technologies, for financial or other transaction systems, without departing from the scope and spirit of the present invention. Accordingly, it is to be understood that the invention is not to be limited by the specific illustrated embodiments, but only by the scope of the appended claims.

The invention claimed is:

1. A system for interfacing at least one user interactive device with a trade execution system to execute trading transactions requested by users over a network, comprising:
   an application in communication with the network for interfacing between the at least one user interactive device and the trade execution system and coordinating interaction of the at least one user interactive device with the trade execution system;
   wherein the application contains first and second APIs, wherein the first API is structured to deliver a trading transaction request received from the at least one user interactive device to the trade execution system, and the second API is structured to deliver real-time information relating to the trading transaction request received from the trade execution system to the at least one user interactive device;
   wherein the first API includes at least one stub that is called by the application at a predefined step during processing of the trading transaction request, the at least one stub including code to interface the application with the trade execution system.

2. A system as in claim 1 wherein the application comprises alert means for initiating and sending information relating to the trading transactions to the at least one user interactive device via a packet-switched wireless network independent of any request on demand from the user.

3. A system as in claim 2 wherein the trade execution system is a system which handles financial transaction.

4. A system as in claim 3 wherein the trade execution system is a system which handles trading of financial instruments.

5. A system as in claim 4 wherein the information relates to trading of the financial instruments.

6. A system as in claim 2 wherein the application further comprises confirmation means for sending the users, via the network, a confirmation that the trading transactions requested by the respective users has been completed.

7. A system as in claim 6 wherein the confirmation means includes configuration means that allows each user to select specific conduit for sending the confirmation and related information of the completed trading transactions to the respective users.

8. A system as in claim 7 wherein the application further comprises means for monitoring the trading transactions requested by the users and verifying integrity of the trading transactions and/or status of accounts of the users.

9. A system as in claim 1 wherein the trade execution system is an existing system, and wherein the application is configured to couple to such existing system to add the functionality of interfacing with the at least one user interactive device substantially without modification of the functionality of the existing system.

10. A system as in claim 9 wherein the application is configured such that the manner of user access to the trade execution system is indistinguishable to the trade execution system at a system level.

11. A system as in claim 1 wherein the application includes at least one API for integrating the functions of the application and the trading execution system without requiring significant modification to the trade execution system.

12. A system as in claim 1 wherein the application comprises:
a plurality of trade application servers;
at least one trade application coupled to each trade application server and to the trade execution system; and
a trade system manager coupled to the plurality of trade application servers, wherein the trade system manager is structured and configured to provide load balancing and high availability by routing user trading requests to the least busy trade application server.

13. A system as in claim 12 where the network comprises an IP network, and the trade system manager is structured and configured to connect unconnected information from various users received over the IP network into a single session.

14. A system as in claim 1 wherein the network includes a wireless network.

15. A system as in claim 14 wherein the wireless network is a digital packet-switched network.

16. A system as in claim 1 wherein the network includes a distributed network which operates on the TCP/IP protocol.

17. A system as in claim 16 wherein the distributed network is an IP network.

18. A system as in claim 1 wherein the user interactive devices are based on different operating platforms.

19. A system as in claim 18 wherein the trade execution system communicates with the user interactive devices in a device independent fashion.

20. A system for interfacing at least one user interactive device with a trade execution system to execute trading transactions requested by users over a network, comprising:
an application in communication with the network for interfacing between the at least one user interactive device and the trade execution system and coordinating interaction of the at least one user interactive device with the trade execution system;
wherein the trade execution system is an existing system, and wherein the application is configured to couple to such existing system to add the functionality of interfacing with wireless user interactive devices substantially without modification of the functionality of the existing system;
wherein the application contains first and second APIs, wherein the first API is structured to deliver a trading transaction request received from the at least one user interactive device to the trade execution system, and the second API is structured to deliver real-time information relating to the trading transaction request received from the trade execution system to the at least one user interactive device;
wherein the first API includes at least one stub that is called by the application at a predefined step during processing of the trading transaction request, the at least one stub including code to interface the application with the trade execution system.

21. A system as in claim 20 wherein the application is configured such that the manner of access to the trade execution system by the at least one user interactive device is indistinguishable to the trade execution system at a system level.

22. A system for interfacing at least one user interactive device with a trade execution system to execute trading transactions requested by users over a network, comprising:
an add-on transaction system in communication with the trade execution system and the network, wherein the transaction system coordinates interaction of the at least one user interactive device the trade execution system;
wherein the add-on transaction system contains first and second APIs, wherein the first API is structured to deliver a trading transaction request received from the at least one user interactive device to the trade execution system, and the second API is structured to deliver real-time information relating to the trading transaction request received from the trade execution system to the at least one user interactive device;
wherein the first API includes at least one stub that is called by the add-on transaction system at a predefined step during processing of the trading transaction request, the at least one stub including code to interface the add-on transaction system with the trade execution system.

23. A system as in claim 22 wherein the add-on transaction system interacts with the at least one user interactive device independent of the functions of the financial transaction execution system.

24. A system for interfacing at least one user interactive device with a trade execution system to execute trading transactions requested by users via an IP network, comprising:
a transaction system in communication with the trade execution system and the IP network, wherein the transaction system coordinates interaction of the at least one user interactive device with the trade execution system based on TCP/IP protocols;
wherein the transaction system contains first and second APIs, wherein the first API is structured to deliver a trading transaction request received from the at least one user interactive device to the trade execution system, and the second API is structured to deliver real-time information relating to the trading transaction request received from the trade execution system to the at least one user interactive device;
wherein the first API includes at least one stub that is called by the transaction system at a predefined step during processing of the trading transaction request, the at least one stub including code to interface the transaction system with the trade execution system.

25. A system as in claim 24 further including a wireless network between the IP network and the at least one user interactive;
interfacing a transaction system between a trade execution system and a network; coordinating, using the transaction system, interaction of the at least one user interactive device with the trade execution system;

wherein the transaction system contains first and second APIs, wherein the first API is structured to deliver a trading transaction request received from the at least one user interactive device to the trade execution system, and the second API is structured to deliver real-time information relating to the trading transaction request received from the trade execution system to the at least one user interactive device;

wherein the first API includes at least one stub that is called by the transaction system at a predefined step during processing of the trading transaction request, the at least one stub including code to interface the transaction system with the trade execution system device.

26. A method for executing trading transactions requested by users using at least one user interactive device, comprising the steps of:

interfacing a transaction system between a trade execution system and a network; and coordinating, using the transaction system, interaction of the at least one user interactive device with the trade execution system:

wherein the transaction system contains first and second APIs, wherein the first API is structured to deliver a trading transaction request received from the at least one user interactive device to the trade execution system, and the second API is structured to deliver real-time information relating to the trading transaction request received from the trade execution system to the at least one user interactive device;

wherein the first API includes at least one stub that is called by the transaction system at a predefined step during processing of the trading transaction request, the at least one stub including code to interface the transaction system with the trade execution system.

27. A method as in claim 26 wherein the transaction system coordinates interaction with the user interactive devices independent of the functions of the trading execution system.

28. A method for providing a trading execution system with the functionality of interacting with at least one user interactive device via an IP network, comprising the steps of:

interfacing a transaction system between the at least one user interactive device and the trade execution system, wherein the transaction system coordinates interaction of the trade execution system with the at least one user interactive device based on TCP/IP protocol;

wherein the transaction system contains first and second APIs, wherein the first API is structured to deliver a trading transaction request received from the at least one user interactive device to the trade execution system, and the second API is structured to deliver real-time information relating to the trading transaction request received from the trade execution system to the at least one user interactive device;

wherein the first API includes at least one stub that is called by the transaction system at a predefined step during processing of the trading transaction request, the at least one stub including code to interface the transaction system with the trade execution system.

* * * * *